United States Patent [19]

King

[11] Patent Number: 4,887,684

[45] Date of Patent: Dec. 19, 1989

[54] VEHICLE SPEED LIMITING SYSTEM

[75] Inventor: Lael D. King, Minneapolis, Minn.

[73] Assignee: Electronic Control Systems, Inc., Minneapolis, Minn.

[21] Appl. No.: 115,446

[22] Filed: Oct. 30, 1987

[51] Int. Cl.⁴ .............................................. B60K 31/04
[52] U.S. Cl. .................................... 180/179; 123/350
[58] Field of Search ....................... 180/170, 178, 179; 123/349, 350

[56] References Cited

U.S. PATENT DOCUMENTS

| 4,187,734 | 2/1986 | Mann | 74/405 |
| 4,401,075 | 8/1983 | O'Keefe, Jr. et al. | 180/178 |
| 4,604,976 | 8/1986 | Sturdy | 123/361 |
| 4,643,038 | 2/1987 | Byram | 180/178 |

OTHER PUBLICATIONS

Econocruise Limited, Product Brochure, EMA Speed Control System from Econocruise.

Hewitt Industries, Product Brochure, Vehicle Speed Limiting.

Primary Examiner—Charles A. Marmor
Assistant Examiner—Richard Camby
Attorney, Agent, or Firm—Anthony G. Eggink

[57] ABSTRACT

A control system for use with the throttle linkage of a motor vehicle to limit the speed of the motor vehicle to a predetermined level. The control system comprises a speed sensor communicatively connected to the motor vehicle which outputs electrical signals which are a function of the speed of the motor vehicle. An acutation control unit is connected to the speed sensor. The actuation control unit receives the output signals from the speed sensor and has a control circuit for processing the output signals to provide electrical control signals when the motor vehicle attains the predetermined level and an actuator responsive to the control signals. The control system further comprises a linkage mechanism connected to the throttle linkage. The linkage mechanism is communicatively connected to the actuator so that the actuator controls the throttle linkage.

17 Claims, 4 Drawing Sheets

VEHICLE SPEED LIMITING SYSTEM

BACKGROUND OF THE INVENTION

This invention relates to control mechanisms for motor vehicle engine operation and more particularly to systems for limiting the speed of the motor vehicle. The device is particularly useful for limiting the operating speed of diesel engine powered motor vehicles to a preset maximum value.

A speed limiter or governor limits the speed of the vehicle to a predetermined maximum. Speed limiting is typically accomplished by either a fuel bypass, a shutdown lever, or engine oil pressure control means.

Speed limiting systems are being used with increased frequency in the trucking industry by fleet owners for reasons of economy and safety. Speed limitation reduces the amount of fuel consumption during vehicle operation. Speed limitation also minimizes overall vehicle maintenance and particularly that required by the engine. Further, speed limitation increases vehicle operating safety through adherence to posted speed limits. This is a particularly important result for buses and motor coaches. Additionally, through adherence to posted speed limits, speed limiting systems help to maintain good operator driving records. Finally, speed limiting systems may provide added operator comfort and convenience through automatic maintenance of a preset maximum speed.

In the past, speed limiter devices have been used and proposed to limit the speed of motor vehicles, and some of these prior art devices are usable for diesel powered vehicles including trucks. However, these devices are generally complex, difficult to construct and install, and are inefficient and often unsafe to use. Specifically, some prior art devices are susceptible to manipulation by the operator to exceed the preset maximum speed limit. This practice, referred to as "teasing", involves repeatedly accelerating and decelerating the vehicle by depressing and releasing the accelerator pedal. These prior art devices have a long lag period before regaining control of the speed. This allows the vehicle speed to overshoot the speed limit momentarily, thereby increasing the average speed of the vehicle over the cycle of teasing. Such practices are inherently unsafe.

Some prior art devices are ineffective at limiting the vehicle speed to the preset maximum, particularly under windy weather conditions, heavy loads, steep grades or fast acceleration. These devices cause the vehicle to surge under these conditions. The surge phenomenon is both uncomfortable for the operator and unsafe.

Other prior art governor devices provide rough and inaccurate speed limitation which results in disconcerting speed variations. Such variations lead to operator dissatisfaction and rejection of use of the device.

Despite the need for a speed limiter device in the art which provides efficient and reliable speed limitation for motor vehicles, particularly diesel powered vehicles, which is simple to manufacture, install and use, and which overcomes the limitations and problems of the prior art, none insofar as is known has been proposed or developed.

Accordingly, it is an object of the present invention to provide a speed limiting device which reliably adheres to a predetermined maximum under a variety of weather, load, grade and acceleration conditions. It is a further object of the present invention to provide a speed limiter which is not susceptible to overshoot and droop. It is another object of this invention to provide a device which yields smooth and substantially imperceptable speed limitation. Also, it is an object of this invention to provide a speed limiter which is compact, unitary and easy to manufacture, install and maintain.

SUMMARY OF THE INVENTION

The present invention provides a speed limiter system for use with the fuel pump throttle of a motor vehicle and which limits the speed of the motor vehicle to a predetermined level. The control system comprises a speed sensor communicatively connected to the motor vehicle which outputs variable signals which are a function of the speed of the motor vehicle. The limiter system further comprises a control unit which is connected to the speed sensor and which receives the output signals from the speed sensor. The control unit has a control circuit for processing the output signals and an actuator which is responsive to the control circuit. The limiter system further comprises a linkage mechanism connected to the motor vehicle throttle and which is communicatively connected to the actuator so that the actuator controls the linkage mechanism to control the throttle.

The speed sensor comprises a magnetic reference means fixed to the motor vehicle drive shaft for rotation therewith, and stationary magnetic sensing means disposed adjacent to the reference means. The sensing means produces a variable output electrical signal, related to the rotational speed of the reference means, which represents the instantaneous speed of the vehicle.

The control circuit compares the variable output signal from the speed sensor with a preset reference signal which represents the maximum speed desired for the vehicle. The control circuit provides actuating signals to the actuator to limit vehicle speed when the vehicle speed reaches the preset limit. The control circuit also receives and correlates feedback signals from the actuator to control the rate of actuation.

The actuator comprises a motor communicatively connected to the control circuit, a rotatable, disc-shaped cam member connected to the rotor by a shaft member through a gearbox, and a reel assembly rotatably mounted on the actuator. A cable is connected to a predetermined point on the cam member, wound in the reel assembly and extends therefrom to the linkage arm. Actuation feedback means are communicatively coupled with the cam member and with the control circuit. The actuation feedback means provides information on the degree of cable extension or retraction to the control circuit. The actuation feedback means has a pair of limit switches disposed about the cam member and in mechanical contact therewith. The degree of cable extension is related to the angular position of the predetermined point on the cam member and controlled by the actuation feedback means in cooperation with the control circuit. The limit switches controls the maximum and minimum amount of cable extension, while the reel assembly regulates the rate of cable extension therebetween.

The linkage mechanism comprises an arm member connected to the throttle linkage at the motor vehicle so that actuation by the speed limiting system overrides operation of the throttle linkage by the accelerator.

These and other benefits of this invention will become clear from the following description by reference to the drawings.

DESCRIPTION OF THE PREFERRED EMBODIMENT

Figure 1:
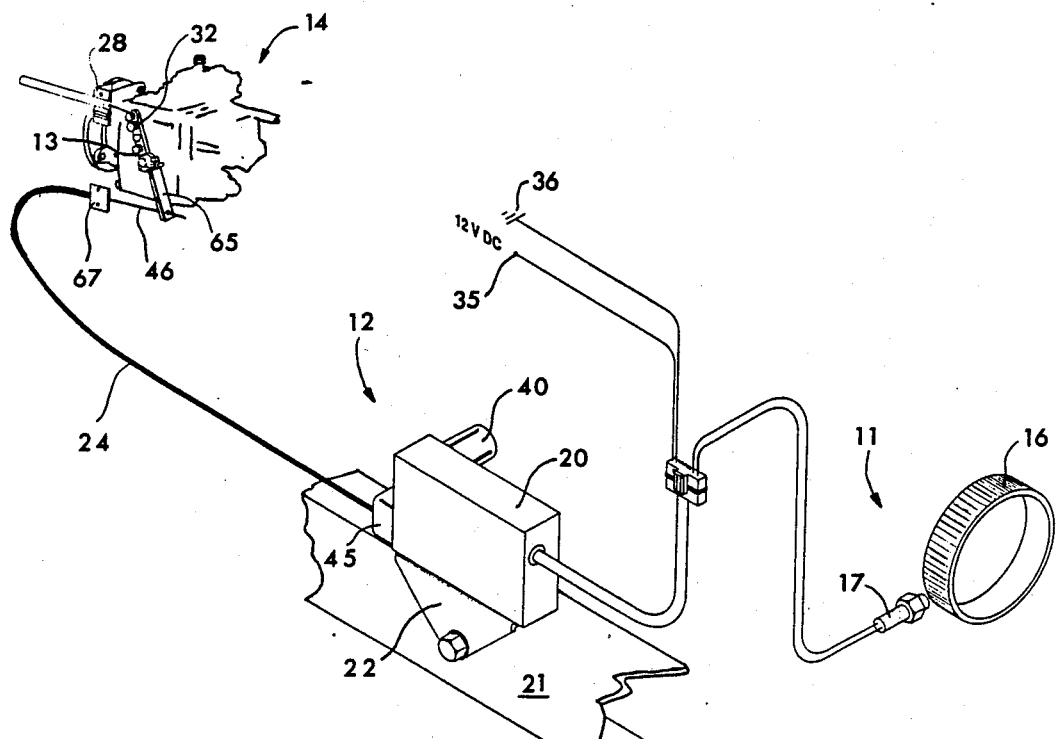
FIG. 1 is a perspective view of the vehicle speed limiting system of the present invention in an operative position on a motor vehicle.

FIG. 1 shows the vehicle speed limiting system 10 of the present invention. The system 10 comprises a speed sensor 11, a control unit 12 and a linkage mechanism 13. The system 10 is for use with the throttle 15 on the fuel pump 14 of a motor vehicle to limit the speed of the motor vehicle to a predetermined level.

The speed sensor 11 outputs electrical signals which are a function of the speed of the vehicle. The speed sensor 11 comprises a magnetic reference collar 16 and a stationary magnetic sensor 17. The reference collar 16 is fastened and connected to the drive shaft of the motor vehicle so that it rotates therewith. The reference collar 16 is preferably a flexible strip having approximately forty (40) alternating magnetic sections or teeth of opposite polarity. The stationary magnetic sensor 17 is disposed adjacent to and aligned with the collar 16 at a distance of approximately ⅛ inch. The sensor 17 has a steel permanent magnet core approximatley ⅛ inch in diameter, which is wrapped by a wire winding. The stationary magnetic sensor 17 produces a variable reference output electrical signal the frequency of which is related to the rotational speed of the collar 16 and hence, the drive shaft. This speed sensor arrangement produces a 483 Hz signal at a vehicle speed of 62 miles per hour on a vehicle having an engine speed to drive shaft speed ratio of 1:1±0.05. Alternatively, other speed sensor embodiments known in the art are usable with the system of the present invention.

Figure 2:
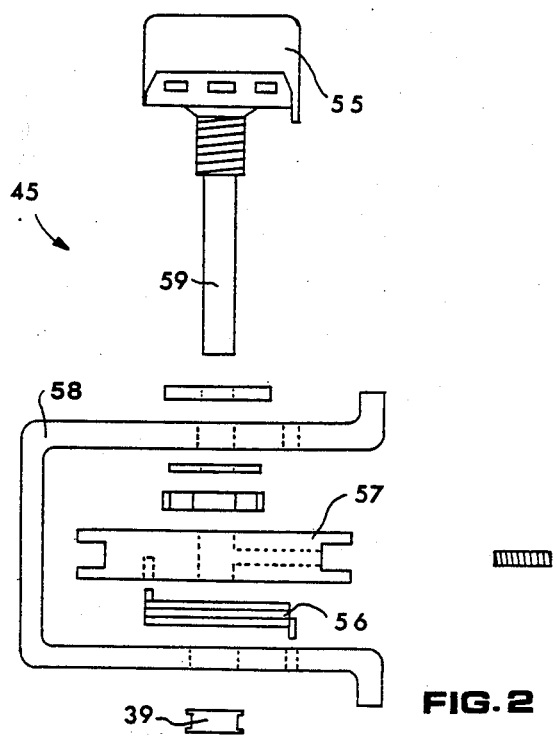
FIG. 2 is a side view of the reel assembly of the present invention with its components shown separated for clarity.
Figure 3:
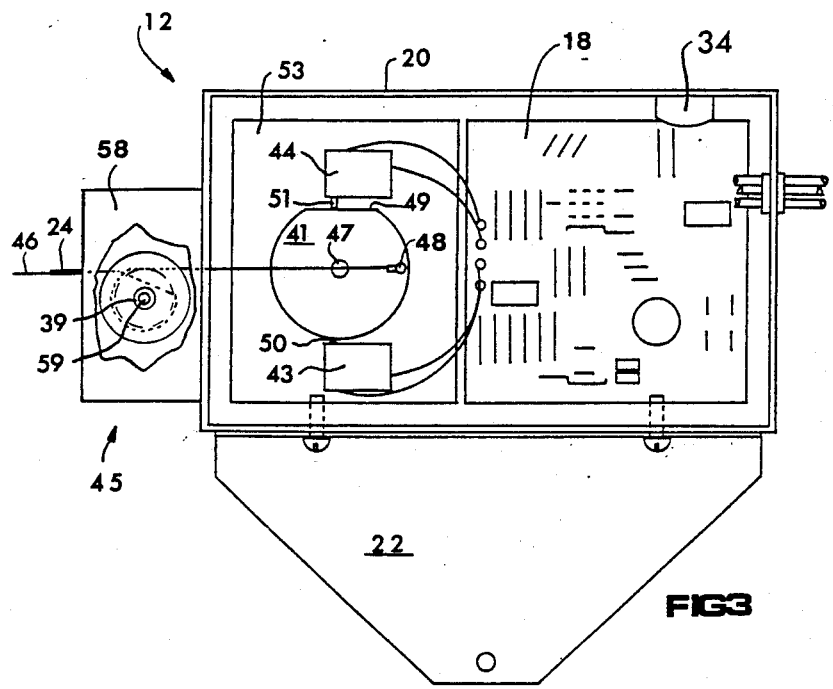
FIG. 3 is a top view of the actuation control unit with its housing opened to show its internal components and further showing the actuator cable in a fully retracted position to decelerate the throttle.

The control unit 12 is communicatively connected to the stationary magnetic sensor 17 of the speed sensor 11 and receives electrical output signals therefrom. Referring also to FIGS. 2 and 3, the control unit 12 has a control circuit 18 which processes electrical output signals from the speed sensor 11 to provide electrical control signals when the motor vehicle speed reaches the preset level. The control unit 12 also has an actuator 19 which is communicatively connected to the control circuit 18 and responsive to the electrical control signals. The control unit 12 is preferably disposed in a sealed housing 20 which is attached to the motor vehicle frame 21 via a bracket 22. The housing 20 protects system components from the environment. Additionally, the housing 20 protects the components from unauthorized tampering.

Figure 7:
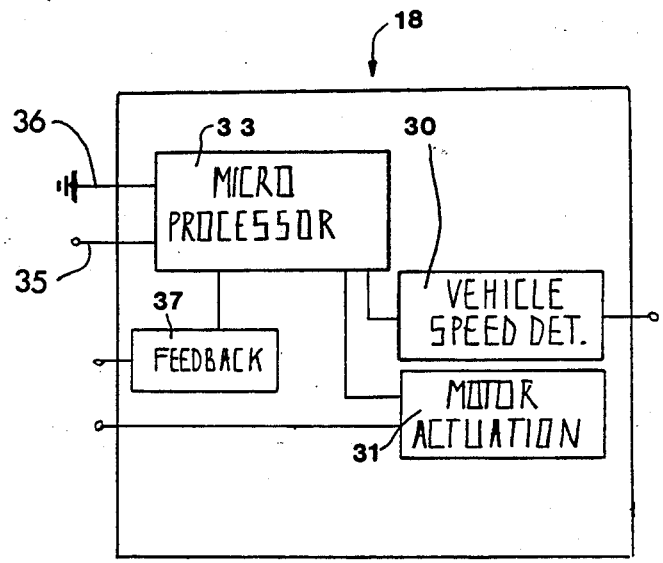
FIG. 7 is a diagram showing the control circuit of the present invention.

Referring to FIG. 7, the control circuit 18 comprises a vehicle speed determination system 30, a motor control system 31, an actuation feedback system 37, a microprocessor 33, a power supply connection 35 and a connection to ground 36. The microprocessor 33 has a memory and a stored program for program control of the microprocessor 33. The power supply connection and ground connection 36 are linked to respective complimentary vehicle power and ground systems. An adjustment switch 34 is connected to the control circuit 18 for selecting the maximum speed limit for the system 10. The control circuit 18 compares the variable output signal from the speed sensor 11 with the preset maximum speed to activate the actuator 19 when the instantaneous vehicle speed attains the maximum speed. The control circuit 18 also correlates signals from the feedback system (described below) to adjust the rate of actuation.

Figure 4:
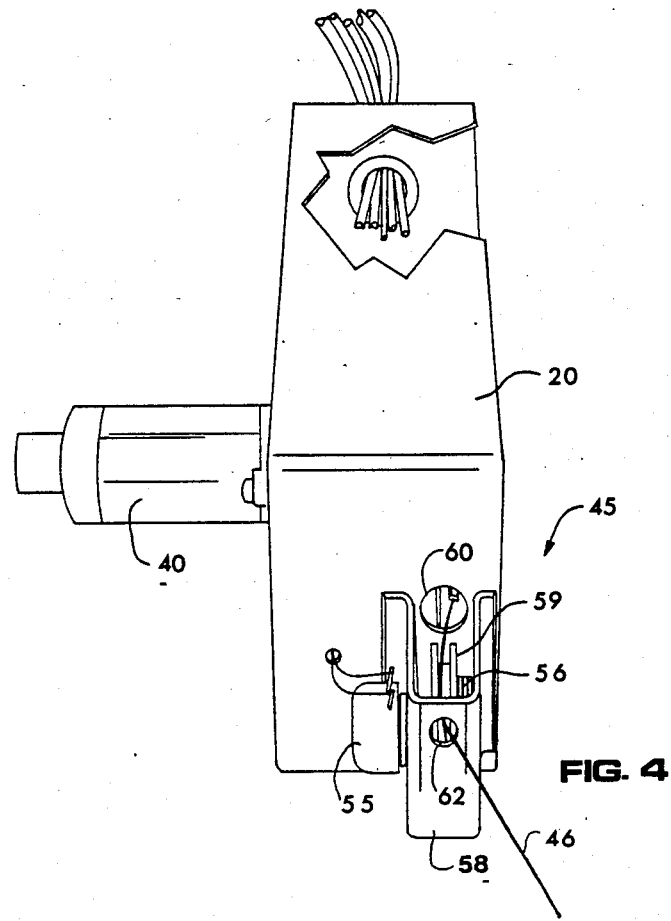
FIG. 4 is a side view in perspective of the actuation control unit.

Referring to FIGS. 2-4, the actuator 19 comprises a motor 40, a cam disc 41, a gearbox 42, first and second or limit switches 43 and 44, a reel assembly 45, a potentiometer 55 and an actuator cable 46. The actuator 19 receives electrical control signals from the control circuit 18. The actuator 19 is communicatively coupled to the linkage arm 13 by the actuator cable 46 so that it linearly moves the linkage arm 13 in response to the electrical control signals.

The motor 40 is a 12 volt bi-directional, permanent magnet DC gear motor. Importantly, it has a speed in the range of 14 to 20 RPM. The motor 40 is communicatively connected to the control circuit 18 and controlled thereby. A gearbox (not shown) is connected to and driven by the motor 40. The gearbox structure is further shown and described in a copending U.S. patent application filed by Lael D. King for a Vehicle Speed Regulating System, Ser. No. 07/116,003, which is hereby incorporated by reference. The gearbox preferably has a gear ratio of 135:1 for operation in the above-mentioned RPM range. Such a motor 40 and gearbox are manufactured by Dayton Electric Mfg. Co., Chicago, Ill. The rotatable, radial cam disc 41 is connected to the gearbox by an axially attached shaft 47 which extends from the center of the cam disc 41. The cam disc 41 is rotated in a clockwise direction for cable 46 retraction or deceleration and in a counterclockwise direction to release deceleration.

The cam disc 41 is a thin, circular metal disc approximately 5 cm. in diameter. It has a single rectilinear portion 49 approximately 1.7 cm. in length in its circumferential edge. The cam disc 41 has a connection pin 48 disposed at a near-circumferential point on its top or outer surface approximately 2 cm. from its center, to which is pivotally attached one end of the cable 46. The connection pin 48 is preferably located at a 90 degree angle from the rectilinear portion 49 with respect to the center of the cam disc 41. The plane of the cam disc 41 is perpendicular to the axis of the shaft 47. Hence, rotation of the cam disc 41 causes the cable 46 to be extended or retracted in the same plane and generally in an arc from the center of the cam disc 41. The distance through which the cable 46 is extended or retracted by the cam disc 41 is referred to as the "throw" of the cable 46 and is equal to twice the distance between the center of the cam disc 41 and the connection pin 48.

The first and second limit switches 43 and 44 are disposed adjacent to the circumferential edge of the cam disc 41 on opposite sides thereof so that they are aligned at a generally right angle to the direction of movement of the actuation cable 46. The switches 43 and 44 are mounted on a base plate 53. Each switch 43 and 44 has a cam follower member 50 and 51 respectively, contacting the circumferential edge surface of the cam disc 41. The first and second limit switches 43 and 44 provide electrical feedback signals to the control circuit 18 based on the angular position of the rectilinear portion 49 such that the connection pin 48 on the face of the cam disc 41 is rotatable through 180 degrees to fully extend and retract the attached actuation cable 46 through a distance or throw of approximately 4 cm. The control circuit 18 is thereby provided information as to whether the cable 46 is either fully extended, fully retracted or thereinbetween based on the mechanical contact of the cam 41 with the limit switches 43 and 44.

The reel assembly 45 is mounted to the exterior of the housing 20 adjacent to the cam disc 41. The reel assembly 45 facilitates the linearity of retraction and extension of the actuator cable 46. The reel assembly 45 also provides feedback information to the control circuit 18 on the rate of a cable 46 extension or retraction. The reel assembly 45 comprises the variable resistor or potentiometer 55, a biasing means 56, a cable pully 57 and a bracket 58. The bracket 58 is preferrably mounted to the exterior of the housing 20. The cable pully 57 is disposed within the bracket 58 so that it is generally coplanar with the cam disc 41. The diameter of the cable pully 57 is dependent on the throw of the cam disc 41 and the required linear movement of the cable 46. The cable pully 57 has a shaft 59 which is rotatably coupled with the bracket 58 at both ends by bushings 39. The variable resistor 55 is mounted on the exterior of the bracket 58 and axially attached to one end of the shaft 59 which is extended through one bushing 39. Rotation of the shaft 59 changes the resistance value of the variable resistor 55. The biasing means 56 is preferably a coiled spring disposed within the bracket 58 and concentrically around the shaft 59. The spring 56 is attached to the bracket 58 at one end and to one face of the cable pully 57 at its other end so that it produces a biasing force in the opposite direction of the rotation of the cable pully 57 from an initial position.

The actuator cable 46, being pivotally attached at one end to the cam disc 41, extends, without slack, through an aperture 60 in the housing 20 and to the cable pully 57. The cable 46 is coiled around the cable pully 57 and runs through an insertion slot 61 in the cable pully 57 to couple the cable 46 to the pully 57. The amount of cable 46 coiling and the alignment of the insertion slot are dependent upon the diameter of the cable pully 57 and the required linear movement of the cable 46. The coiled cable 46 extends tangentially from the cable pully 57 through an aperture 62 in the bracket 58. The bracket aperture 62 is on the side of the cable pully 57 that is generally opposite the housing aperture 60. The two apertures 60 and 62 are also generally aligned with one another.

In the initial position, wherein the cable 46 is fully extended, the connection pin 48 of the cam disc 41 is nearest the housing aperture 60. Retraction of the cable 46 through the housing aperture 60, via clockwise rotation of the cam disc 41 causes the cable 46 to uncoil from the cable pully 57. This causes the cable pully 57 to rotate in a counterclockwise direction thus recoiling the other end of the cable 46, which is retracted through the bracket aperture 62. Rotation of the cam disc 41 through 180 degrees causes the cable pulley 57 to rotate a corresponding amount and yields a cable throw from the pully 57 of approximately 3 inches.

Angular movement of the cam disc 41 thus causes rotation of the cable pully 57 in the opposite direction and subsequent linear retraction or extension of the actuator cable 46 through the bracket aperture 62. The magnitude of retraction or extension of the actuator cable 46 is controlled by the control circuit 18 based on the output signals from the speed sensor 11. The rate of retraction or extension is regulated by the loop feedback system comprising the cooperating cable pully 57 and variable resistor 55.

The variable resistor 55 is also communicatively connected to the control circuit 18. It is preferably a 5 kilo-ohm, type AB, OHMITE (R) potentiometer. As noted above, the magnitude of cable movement is a function of the angular rotation of the cable pulley 57. Because the potentiometer 55 is axially attached to the rotatable shaft 59 of the reel assembly, this relationship enables the control unit 12 to correlate the changing resistance value of the potentiometer 55 with the rate of cable extension. This variable resistance value is transmitted to the control circuit 18 and is utilized as a reference to be compared with the preset maximum speed reference and the variable reference signal from the speed sensor 11.

The actuator cable 46 extends from the actuator 19 and to the vehicle throttle linkage 13. Referring to FIG. 1, the portion 24 of the cable 46 which extends between the reel assembly 45 and the linkage 13 is sheathed or jacketed in a manner known in the art. The sheathing may be connected to the bracket aperture 62, which is threaded, and to a cable alignment bracket 67. The alignment bracket 67 is attached to the fuel pump 14 or the like and has the cable 46 extended through it for alignment with the linkage arm 13. The throttle linkage 13 is connected to the throttle rod 15. A linkage bolt 65 is connected to one end of the throttle linkage 13 and attached to cable 46 to the throttle linkage 13. The operation of the actuator 19, described above, and resultant actuator cable 46 retraction applies an angular, pulling force on the linkage arm thus causing it to pivot or rotate the throttle rod 15 and decelerate the vehicle. Extension of the cable 46 allows the throttle rod 15 to rotate back to an initial position typically from the force of a spring to release deceleration.

Figure 5:
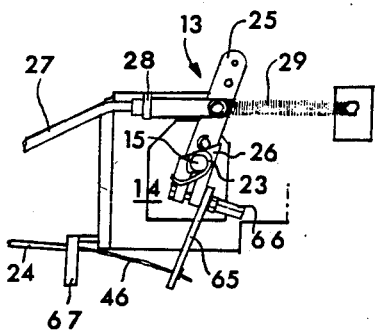
FIG. 5 is a front view of the throttle linkage of a motor vehicle shown in an idling position with the speed limiter invention connected therewith.

Referring to FIG. 5, a typical throttle linkage 13 is shown having an upper acceleration member 25 and a lower deceleration member 26, both connected to the throttle spindle 15 and pivotally connected to each other by a connection spring 23. The accelerator cable 27, which is connected to the accelerator pedal in the vehicle cab, is connected to the acceleration member 25 via a support member 28. Upon depression of the accelerator pedal by the driver, the accelerator cable 27 retracts and pulls the throttle linkage 13 via the acceleration member 25. Movement of the throttle linkage 14 rotates the throttle spindle 15 in a counterclockwise direction to accelerate the vehicle. Upon release of the accelerator pedal, an accelerator spring 29 returns the throttle linkage 13 to its idling position.

The throttle spindle 15 is rotatable through a radius of typically from 26 to 36 degrees depending upon the vehicle, for full acceleration. The counterclockwise rotation of the throttle spindle 15 may be overridden by the deceleration member 26. The deceleration member 26 rotates with the acceleration member 25 during acceleration due to the tension from the linkage arm spring 23. The tension from the spring 23 is overcome, upon the application of an angular force on the deceleration member 26, whereby the deceleration member 26 pivots away from the acceleration member 25. The deceleration member 26 pivots and rotates the throttle spindle in the clockwise direction to decelerate the vehicle.

A rigid rectilinear arm member 65 is connected to the deceleration member 26 of the throttle linkage 13 by means of a connecting nut 66. The actuator cable 46 is attached to the end of the arm member 65 opposite the connection to the throttle linkage 13. The connection location for the actuator cable 46 is dependent upon the rotation radius of the throttle spindle 15 and the cable throw from the actuator 19.

Figure 6:
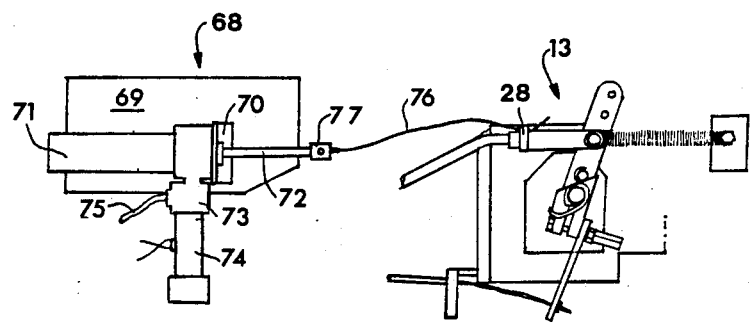
FIG. 6 is a front view of the speed maintenance embodiment of the present invention in operative attachment with the vehicle throttle linkage.

Referring to FIG. 6, the speed limiter invention may have an accelerator mechanism 68 for fully opening the throttle linkage to accelerate the vehicle. In the fully accelerated mode, the actuator 19 limits the vehicle speed to the preset maximum. The speed limiter thus provides vehicle speed maintenance at the preset maximum speed without the use of the accelerator pedal. The accelerator mechanism 68 has a mounting bracket 69, a pneumatic cylinder 71, a piston 72, an air valve 73, and a solenoid 74. The accelerator 68 is attached via the mounting bracket 69, to a location in the vehicle adjacent to the throttle linkage 13 such that a retracting force therefrom will accelerate or open the throttle linkage 13. The cylinder 71 is connected to the mounting bracket 69 by a cylinder mount 70. The piston 72 is retracted into the cylinder 71 upon the activation of the attached air valve 73 by the solenoid 74. The air valve 73 is connected to the vehicle air pressure system via a host 75. The solenoid 74 is communicatively connected via the control circuit 18, to switch means (not shown) located in the vehicle cab for driver activation. An accelerator mechanism cable 76 is connected to the extended end of the piston 72 by a piston connector 80 and to the support member 28 of the vehicle accelerator cable 27. Retraction of the piston retracts the cable 79 thereby opening the throttle linkage 13.

As many changes are possible to the embodiments of this invention utilizing the teachings thereof, the descriptions above, and the accompanying drawings should be interpreted in the illustrative and not the limited sense.

That which is claimed is:

1. A control system for use with the throttle linkage of a motor vehicle, said control system limiting the speed of the motor vehicle at a predetermined level, comprising:
   a. a speed sensor communicatively connected to the motor vehicle to provide output signals which are a function of the instantaneous speed of the motor vehicle;
   b. an actuation control unit connected to said speed sensor, said actuation control unit having a control circuit processing said output signals to provide electrical control signals when the motor vehicle speed attains the predetermined level and an actuator responsive to said electrical control signals, said actuator having a rotatable cam member, a reel assembly, a motor communicatively connected to said control circuit and controlled thereby, said cam member being connected to said motor by a shaft member through a gearbox, and limit means communicatively coupled with said cam member and with said control circuit, said limit means providing information on the angular position of a predetermined point on said cam member to said control circuit, said reel assembly being coupled to said predetermined point on said cam member by a cable, said cable further being wound in said reel assembly and moveable therewith; and
   c. linkage means connected to the throttle linkage, said linkage means further being communicatively connected to said cam member and said reel assembly, and being radially and linearly moveable thereby so that said actuator controls the throttle linkage.

2. The control system of claim 1, wherein said speed sensor comprises magnetic reference means fixed and connected to the motor vehicle drive shaft for rotation therewith, and stationary magnetic sensing means disposed adjacent to said reference means at a predetermined distance therefrom, said sensing means producing an electrical output signal related to the rotational speed of said reference means.

3. The control system of claim 1, wherein said control circuit comprises vehicle speed determination means, motor control means, actuation feedback means, a microprocessor having a memory and a stored program for program control of said microprocessor, adjustment means, and a power supply connection.

4. The control system of claim 1, wherein said reel assembly comprises a rotatably mounted cable pully having means to couple said cable and being coplanar with said cam member, means to bias the rotation of said cable pully, and variable resistance means connected to said cable pully by a shaft and further being communicatively connected to said control circuit and providing information on the rate of extension and retraction of said cable.

5. The control system of claim 1, wherein said motor is a reversible 12 volt permanent magnet DC gear motor.

6. The control system of claim 1, wherein said motor has an operating speed in the range of 14 and 20 RPM and wherein said gearbox has a gear ratio of approximately 135:1.

7. The control system of claim 1, wherein said limit means comprises a first switch means mounted adjacent to said cam member and having a cam follower contacting said cam member, and a second switch means mounted adjacent to said cam member at a location opposite said first switch means and having a second cam follower contacting said cam member.

8. The control system of claim 7, wherein said cam member is constructed to provide three states of mechanical input to said limit means through 180 degrees of angular rotation of said cam member.

9. The control system of claim 1, wherein said linkage means comprises an alignment bracket connected to the motor vehicle and a connecting nut connected to the throttle linkage for aligning and connecting said actuator to the throttle linkage.

10. The control system of claim 1, wherein said linkage means comprises a rigid arm member connected to one end to the throttle linkage, and a cable being connected at the opposite end of said arm member so that said cable causes said arm member to rotate the throttle linkage.

11. The control system of claim 1, wherein said linkage means includes means to fully open the throttle linkage, whereby said actuator retards the opening of the throttle linkage to maintain the speed of the vehicle at the preset maximum speed.

12. The control system of claim 11, wherein said means to open comprises a pneumatic actuator connected to the throttle linkage.

13. A throttle control system for use with the throttle linkage of a motor vehicle, said control system limiting the speed of the motor vehicle at a predetermined level, comprising:
   a. a speed sensor communicatively connectable to the motor vehicle and outputting electrical signals which are a function of the speed of the motor vehicle;
   b. an actuation control unit connected to said speed sensor, said actuation control unit receiving said output signals from said speed sensor, said actuation control unit having a control circuit processing said output signals to provide electrical control signals when the motor vehicle speed attains the predetermined level, a motor communicatively connected to said control circuit and controlled thereby, a rotatable, radial cam member connected to said motor by a shaft member through a gearbox, limit means communicatively coupled with said cam member and with said control circuit, said limit means providing information on the angular position of a predetermined point on said cam member to said control circuit, and a reel assembly coupled to said predetermined point on said cam member by a cable, said cable further being wound in said reel assembly and extending therefrom; and
   c. linkage means connected to the throttle linkage, said linkage means further being communicatively connected to said cable so that said actuator controls the throttle linkage.

14. The control system of claim 13, wherein said linkage means comprises a rigid arm member connected at one end to the throttle linkage, said cable being connected at the opposite end of said arm member so that said cable causes said arm member to rotate the throttle linkage.

15. The control system of claim 13, wherein said linkage means includes means to fully open the throttle linkage, whereby said actuator retards the opening of the throttle linkage to maintain the speed of the vehicle at a preset maximum speed.

16. In combination with a governor for use with the fuel pump of a motor vehicle to limit the speed of the motor vehicle at a predetermined level and being of the type having a speed sensor and a throttle linkage, the improvement comprising an actuator connected to the speed sensor and receiving output signals therefrom and controlling the throttle linkage, said actuator comprising:
   a. a control circuit processing said output signals to provide electrical control signals when the motor vehicle attains the predetermined level;
   b. a motor communicatively connected to said control circuit and controlled thereby;
   c. a rotatable, radial cam member connected to said motor by a shaft member through a gearbox;
   d. position sensing means communicatively coupled with said cam member and with said control circuit, said position sensing means providing information on the angular position of a predetermined point on said cam member to said control circuit; and
   e. a reel assembly coupled to said predetermined point on said cam member by a cable, said cable further being wound in said reel assembly and extending therefrom to the throttle linkage, said reel assembly having feedback means providing information to said control circuit on the rate of actuation.

17. The actuator of claim 16 including means to fully open the throttle linkage, whereby retraction of said cable retards the opening of the throttle linkage to maintain the speed of the vehicle at the preset maximum speed.

* * * * *